(12) United States Patent
Chen et al.

(10) Patent No.: US 9,355,328 B2
(45) Date of Patent: May 31, 2016

(54) IMAGE FOREGROUND MATTING METHOD BASED ON NEIGHBORHOOD AND NON-NEIGHBORHOOD SMOOTHNESS PRIORS

(71) Applicant: BEIHANG UNIVERSITY, Beijing (CN)

(72) Inventors: Xiaowu Chen, Beijing (CN); Dongqing Zou, Beijing (CN); Qinping Zhao, Beijing (CN); Feng Ding, Beijing (CN)

(73) Assignee: Beihang University, Beijing (CN)

( * ) Notice: Subject to any disclaimer, the term of this patent is extended or adjusted under 35 U.S.C. 154(b) by 0 days.

(21) Appl. No.: 14/240,029

(22) PCT Filed: Apr. 24, 2013

(86) PCT No.: PCT/CN2013/074636
§ 371 (c)(1),
(2) Date: Feb. 21, 2014

(87) PCT Pub. No.: WO2014/139196
PCT Pub. Date: Sep. 18, 2014

(65) Prior Publication Data
US 2015/0220805 A1     Aug. 6, 2015

(30) Foreign Application Priority Data
Mar. 13, 2013   (CN) .......................... 2013 1 0080379

(51) Int. Cl.
*G06K 9/48* (2006.01)
*G06K 9/46* (2006.01)
*G06T 7/00* (2006.01)
*G06K 9/52* (2006.01)
*G06T 7/40* (2006.01)

(52) U.S. Cl.
CPC ................ *G06K 9/4604* (2013.01); *G06K 9/52* (2013.01); *G06T 7/0081* (2013.01); *G06T 7/0087* (2013.01); *G06T 7/40* (2013.01); *G06K 2009/4666* (2013.01); *G06T 2207/10016* (2013.01); *G06T 2207/10024* (2013.01); *G06T 2207/20076* (2013.01); *G06T 2207/20101* (2013.01); *G06T 2207/20144* (2013.01); *G06T 2207/20148* (2013.01)

(58) Field of Classification Search
CPC ............ G06T 2207/10024; G06T 2207/20144
USPC ....................................................... 382/199
See application file for complete search history.

(56) References Cited

U.S. PATENT DOCUMENTS

| | | | |
|---|---|---|---|
| 8,391,594 B1 * | 3/2013 | Wang et al. ................... | 382/164 |
| 2010/0061628 A1 * | 3/2010 | Yamada ........................ | 382/167 |
| 2011/0229024 A1 * | 9/2011 | El-Maraghi et al. .......... | 382/162 |
| 2014/0071347 A1 * | 3/2014 | Chen et al. ................... | 348/576 |

* cited by examiner

*Primary Examiner* — Manuchehr Rahmjoo
(74) *Attorney, Agent, or Firm* — Platinum Intellectual Property

(57) ABSTRACT

The present invention discloses an image foreground matting method based on neighborhood and non-neighborhood smoothness priors. The method primarily comprises the steps of: interactively marking foreground points and background points; initializing α values of each unmarked pixel of the input image by a color sampling method, calculating confidence degree of the pixel, and admitting α values of pixels of which confidence degree is larger than a given threshold as known pixels; calculating data term weights, neighborhood smoothness constraint term weights and non-neighborhood smoothness constraint term weights of each pixel in the input image to construct graph patterns of all pixels of the input image; and according to α values of the known pixels, under the constraint of the graph patterns, solving probabilities that each pixel belongs to the foreground by minimizing the energy equation so as to obtain alpha mattes.

11 Claims, 3 Drawing Sheets

IMAGE FOREGROUND MATTING METHOD BASED ON NEIGHBORHOOD AND NON-NEIGHBORHOOD SMOOTHNESS PRIORS

CROSS-REFERENCE TO RELATED APPLICATION

This application is the U.S. national phase of International Application No. PCT/CN2013/074636, filed on Apr. 24, 2013, which claims the priority benefit a Chinese Patent which is application No. 2013100803797 filed on Mar. 13, 2013. the entire contents of which is hereby incorporated by reference.

BACKGROUND OF THE INVENTION

1. Field of the Invention

The present invention belongs to the field of image processing and computer vision, and particularly relates to a novel image foreground matting method based on neighborhood and non-neighborhood smoothness priors.

2. Background of the Invention

Image foreground matting intends to decompose an image I into a foreground F and a background B. From the mathematical point of view, the image I is a linear combination of F and B in the following manner:

$$C = F\alpha + B(1-\alpha),$$

where α defines opacity of each pixel, and has a value in a range of [0, 1]. Accurate image matting is of vital importance in different image and video editing applications. However, since the number of unknown points is much larger than that of known equations, the equations cannot be solved. Therefore, generally a method is adopted in which a user brush type interaction is used or a black-white-gray trimap is input to simplify the solution of such a problem.

The existing image methods can usually be divided into three categories: a sampling-based method, an affinity-based method, and a comprehensive method which is the combination of these two methods.

Sampling-based image foreground matting simultaneously estimates α (alpha) value of a pixel as well its foreground color and background color. In various methods, different parametric or non-parametric models are used to sample neighboring pixels of the known foreground area and background area. Ruzon and Tomasi assume that unknown pixels lie in a narrow band area at the edge of the foreground area. Then, this method was extended by Chuang et al. with a Bayesian framework. In case that the unknown pixels are located near the edge of foreground and the number of unknown pixels is relatively small, these methods provide good results. Rhemann et al. proposes an improved color model based on Geodesic distance sampling. In a shared matting method, the pixels are sampled in different directions of light. Generally, these methods have relatively good effects when the color neighborhoods are smooth.

The affinity-based image foreground matting is independent from the foreground color and background color, so that the problem of alpha matting is solved. In the Poisson matting method, it is assumed that the gradient of alpha mattes is proportional to that of image. In the image foreground matting method based on random walk algorithm (random walk matting), the random walk algorithm is used to solved α values according to the neighboring color similarity. In the closed-form matting method, a color line model is assumed on a neighborhood window, and the problem of alpha matting is solved by minimizing a cost function. In the spectral analysis-based image foreground matting method (spectral matting), its relationship with the spectral clustering is explored so that it is extended into an unsupervised method. Laplacian image matting is combined with different data constraints, prior, or learning-based methods to solve the problem of image matting. However, under the assumption of neighborhood smoothness, this method is insufficient to solve a complicated image problem. Therefore, we combine it with the non-neighborhood smoothness prior to improve the results.

The image foreground matting method, which integrates sampling and similarity, makes a good balance between these two methods. In a robust matting method, samples with high confidence degree are firstly sampled, and then the image foreground matting energy is minimized by the random walk algorithm. In a global sampling matting method, the random search algorithm from the PatchMatch algorithm is used to search global optimal samples.

In the closed-form matting, the Laplacian matrix for image foreground matting is obtained from the color line model, and is used for constraining alpha matting within the neighborhood window. This neighborhood smoothness prior can be combined with the data set obtained from color sampling. Such smoothness prior has a good effect in the image area where there are only a constant number of foreground colors and background colors. He et al. uses a generalized Patchmatch method to improve the effect of color sampling. Recent research indicates that the data set and neighborhood smoothness set can be combined to provide high quality results. However, during calculating Laplacian matrix, it is difficult to set a proper neighborhood window. A small window may be insufficient to capture the detail information of structures. On the other hand, a large window may destroy the color line model, which will also lead to bad results.

Recently, Chen et al. has proposed a manifold preserving edit propagation method, and applied it to the transparent image matting. We note that this method in fact relates to a novel alpha matting based on non-neighborhood smoothness prior. In this method, α values of remote pixels are linked together, which is complementary with Laplacian matting. When only this non-neighborhood smoothness prior is applied, the neighborhood structure information of translucent object would not be captured. Thus, we propose to combine this non-neighborhood smoothness prior with neighborhood Laplacian smoothness prior, and include it into an ordinary data set. Our novel image matting algorithm exhibits excellent performance on the standard test data set.

BRIEF SUMMARY OF THE INVENTION

It is an object of the present invention to provide a novel image foreground matting method based on neighborhood and non-neighborhood smoothness priors. This novel method has excellent performance on the standard test data set.

To accomplish the object of the invention, the present invention adopts the following technical solutions.

There is proposed an image foreground matting method based on neighborhood and non-neighborhood smoothness priors, which comprises the steps of.

step S100, marking the foreground area, the background area, and the unknown area in the input image, wherein the foreground area is an area where the image content to be extracted is located, the background area is an image content background which does not need to be extracted, and the unknown area is an indistinguishable area where the foreground and background overlap, for example, an upstanding hairline area;

step S200, initializing the probabilities α values that the pixel belongs to the foreground by a color sampling method for each pixel in the unknown area of the input image, calculating confidence degree of α values, admitting α values of pixels of which confidence degree is larger than a given threshold, marking these pixels as known pixels, setting α values of each pixel in the foreground area to a maximum value, and setting α values of each pixel in the background area to a minimum value. Usually α values lies between 0 and 1, the foreground area has an α value of 1, the background area has an α value of 0, while the pixel in the unknown area has a α value larger than 0 but smaller than 1. Step S200 aims to determine α values of pixels as many as possible, so as to make preparations for calculating more real α values for pixels in the unknown area whose α values cannot be determined in step S200 (i.e., the pixels whose α values can be calculated, while the calculated α values are not admitted). α values refers to the probabilities that the pixel belongs to the foreground. If the α values of the unknown pixels can be calculated, it is possible to judge whether the pixel belongs to the foreground or the background;

step S300, calculating data term weights of each pixel in the input image according to α values of each pixel, calculating neighborhood smoothness constraint term weights and non-neighborhood smoothness constraint term weights of each pixel, and constructing the overall graph patterns for all pixels of the input image according to these three kinds of weights;

step S400, according to α values of all foreground area pixels, background area pixels and the known pixels in the unknown area, under the constraint of graph patterns from step S300, solving probabilities that each pixel belongs to the foreground by minimizing the energy equation, so as to obtain alpha mattes. As a result, the task of distinguishing whether each pixel in the input image belongs to the foreground or background is completed.

Preferably, in step S100 of said image foreground matting method based on neighborhood and non-neighborhood smoothness priors, a user marks the foreground area, the background area, and the unknown area in the input image via a brush type interaction, or the user inputs a trimap to mark the foreground area, the background area, and the unknown area in the input image. This step is completed by the user. In this step, the user selects the foreground area, the background area, and the fuzzy area (unknown area) with a brush, or distinguishes the foreground area, the background area, and the unknown area by inputting a trimap of the same size as that of the input image.

Preferably, in said image foreground matting method based on neighborhood and non-neighborhood smoothness priors, α values of each pixel in the foreground area are set to the maximum value 1, and α values of each pixel in the background area are set to the minimum value 0.

Preferably, in step S100 of said image foreground matting method based on neighborhood and non-neighborhood smoothness priors, marking the foreground area, the background area, and the unknown area by the user via the brush type interaction comprises:

marking the foreground pixels and background pixels of the image by the user with a brush, wherein pixels covered by a white brush are foreground pixels, pixels covered by a black brush are background pixels, and the other pixels are the unknown pixels; or providing a black-white-gray trimap of the same size as that of the input image by the user, wherein pixels of the input image to which the white area corresponds are foreground pixels, pixels of the input image to which the black area corresponds are background pixels, and pixels of the input image to which the gray area corresponds are the unknown pixels.

Preferably, in step S200 of said image foreground matting method based on neighborhood and non-neighborhood smoothness priors, calculating the probabilities α values that each pixel in the unknown area belongs to the foreground is performed by:

searching for k foreground pixels $F_i$ (i=1~k) and k background pixels $B_j$ (j=1~k) in the input image which are nearest to the position of the unknown pixel in the input image, wherein each foreground pixel and each background pixel are paired to form $k^2$ foreground-background point pairs $F_i$ $B_j$, and calculating α' value for each foreground-background point pair according to the following equation to obtain $k^2$ α' values:

$$\alpha' = \frac{(C - B_j)(F_i - B_j)}{\|F_i - B_j\|^2},$$

where C is the color value of the unknown pixel, wherein, further calculating confidence degree of α' values according to C−(α' $F_i$+(1−α')$B_j$)=d($F_i$,$B_j$), i.e., calculating confidence degree according to the difference d($F_i$,$B_j$) between the color value C of the unknown pixel and the color value α'$F_i$+(1−α')$B_j$ which is estimated on basis of α' values, thus obtaining $k^2$ difference values, wherein a small difference value indicates a high confidence degree of α' values; selecting α' values with the highest confidence degree as α values of the unknown pixel, and selecting the corresponding confidence degree as the confidence degree for α values of the unknown pixel; admitting α values of the unknown pixel of which confidence degree is larger than a threshold d, and admitting the unknown pixel as a known pixel. Finally, it is necessary to solve the remaining α values which have not been admitted, so as to obtain their more approximate solutions.

Preferably, in step S300 of said image foreground matting method based on neighborhood and non-neighborhood smoothness priors, calculating data term weights of each pixel according to α values of each pixel is performed by:

step S310, calculating the data term weight according to the following equations, wherein the data term weight comprises two terms, i.e., the weight value $W_{(i,F)}$ which indicates probabilities that the pixel belongs to the foreground and the weight value $W_{(i,B)}$ which indicates probabilities that the pixel belongs to the background, $$W_{(i,F)}=\gamma\alpha, W_{(i,B)}=\gamma(1-\alpha),$$

where γ is a parameter to balance the data term and the smoothness set. Namely, each pixel has two terms of data term weights.

Preferably, in said image foreground matting method based on neighborhood and non-neighborhood smoothness priors, the parameter γ is set to 0.1.

Preferably, in step S300 of said image foreground matting method based on neighborhood and non-neighborhood smoothness priors, calculating the neighborhood smoothness constraint term weights of the pixel is performed by:

step S320, as for pixel i, constructing the neighborhood smoothness constraint by Laplacian approach within a fixed-size window $w_{k(k=m^2)}$ which is centered at pixel i and covers m*m surrounding pixels in the input image, and calculating the neighborhood smoothness constraint term weight value $W_{ij}^{lap}$ of the neighboring pixel j which surrounds pixel i according to the following equation:

$$W_{ij}^{lap} = \delta \sum_{k}^{(i,j)\in w_k} \frac{1+(C_i-\mu_k)\left(\sum_k + \frac{\varepsilon}{m^2}I\right)^{-1}(C_j-\mu_k)}{m^2},$$

where the number of the neighboring pixel j is $m^2$, lap indicates Laplacian approach, $\delta$ is a parameter which controls the intensity of neighborhood smoothness, $\mu_k$ and $\Sigma_k$ represent the color average and variance of m*m pixels in the window respectively, $\varepsilon$ is a regularized coefficient, $C_i$ represents the color value of pixel i, and I is an identity matrix.

Preferably, in said image foreground matting method based on neighborhood and non-neighborhood smoothness priors, $\varepsilon$ is set to a regularized coefficient of $10^{-5}$, and m has a value of 3.

Preferably, in step S300 of said image foreground matting method based on neighborhood and non-neighborhood smoothness priors, calculating the non-neighborhood smoothness constraint term weights of the pixel is performed by:

step S330, generating a characteristic space which comprises all pixels according to characteristic values for each pixel in the input image, getting k neighboring pixels in the characteristic space which are nearest to pixel i in term of Euclidean distance, constructing the non-neighborhood smoothness constraint by a local linear embedded dimension reduction approach, and obtaining the non-neighborhood smoothness constraint term weight value $W_{im}^{lle}$ under the constraint of $\Sigma_{m=1}^{K} W_{im}^{lle}=1$ by minimizing the following equation:

$$W^{lle} = \underset{W_{im}^{lle}}{\operatorname{argmin}} \sum_{i=1}^{N} \left\| X_i - \sum_{m=1}^{K} W_{im}^{lle} X_{im} \right\|^2,$$

where LLE indicates the local linear embedded dimension reduction approach, m is a neighboring pixel among the k neighboring pixels, N is the number of all pixels in the input image, and $X_i$ indicates the characteristic value of pixel i.

Preferably, in said image foreground matting method based on neighborhood and non-neighborhood smoothness priors, the characteristic value of pixel i comprises $r_i, g_i, b_i, x_i, y_i$, where $r_i, g_i, b_i$ are RGB color values of pixel i, $x_i, y_i$ are coordinate positions of pixel i in the input image, so that said characteristic space is a five dimensional characteristic space which comprises characteristic values $r_i, g_i, b_i, x_i, y_i$.

Preferably, in step S400 of said image foreground matting method based on neighborhood and non-neighborhood smoothness priors, according to the admitted $\alpha$ values of the known pixels in the unknown area, $\alpha$ values of pixels in the known foreground area, and $\alpha$ values of pixels in the known background area, under the constraint of graph patterns from step S300, solving probabilities that each pixel belongs to the foreground by minimizing the following energy equation, thus obtaining alpha mattes:

$$E = \lambda \sum_{i\in S}(\alpha_i - g_i)^2 + \sum_{i=1}^{N}\left(\left(\sum_{j\in N_i} W_{ij}\right)\alpha_i - \sum_{j\in N_i} W_{ij}\alpha_j\right)^2,$$

where, E is energy, $\lambda$ is a weight coefficient, S is a set of all pixels in the input image of which $\alpha$ values are known, $g_i$ is $\alpha$ values determined in step S200 for pixels $\alpha$ values of which are known, $\alpha_i$ in $$\lambda \sum_{i\in S}(\alpha_i - g_i)^2$$

is the optimal $\alpha$ values to be solved in the above energy equation, N refers to the set of all pixels in the graph patterns and two virtual pixel sets $\Omega_F$ and $\Omega_B$ which correspond to the data term $W_{(i,F)}$ and $W_{(i,B)}$ respectively, i indicates pixel i, $N_i$ indicates the set of neighboring pixels of pixel i, and said set of neighboring pixels $N_i$ comprises k neighboring pixels in step S330, neighboring pixels among m*m pixels in step S320, foreground virtual neighboring pixels which correspond to $W_{(i,F)}$, and background virtual neighboring pixels which correspond to $W_{(i,B)}$, wherein $W_{ij}$ represents three kinds of weight values, which comprise data term weight value $W_{(i,F)}$ and $W_{(i,B)}$, neighborhood smoothness term weight value $W_{ij}^{lap}$, and non-neighborhood smoothness term weight value $W_{ij}^{lle}$.

The above function can be expressed in the following matrix form:

$$E = (\alpha - G)^T \Lambda (\alpha - G) + \alpha^T L^T L \alpha,$$

where:

$$L_{ij} = \begin{cases} W_{ii}: & \text{if } i = j, \\ -W_{ij}: & \text{if } i \text{ and } j \text{ are neighbors}, \\ 0: & \text{otherwise}, \end{cases}$$

and $\Lambda_{ii} = \begin{cases} \lambda & i \in S \\ 0 & \text{otherwise} \end{cases}$, $G_i = \begin{cases} g_i & i \in S \\ 0 & \text{otherwise} \end{cases}$.

The expression of the above energy equation in the matrix form is a quadratic equation of $\alpha$, and $\alpha$ values can be minimized by solving the following linear equation:

$$(\Lambda + L^T L)\alpha = \Lambda G.$$

The above equation is a system of sparse linear equations, and a global optimal closed-form solution can be solved by a preconditioned conjugate gradient method.

The image foreground matting method based on neighborhood and non-neighborhood smoothness priors of the present invention can accurately extract the foreground like hairlines from an image and has a high accuracy.

DETAILED DESCRIPTION OF THE EMBODIMENTS

Figure 1:
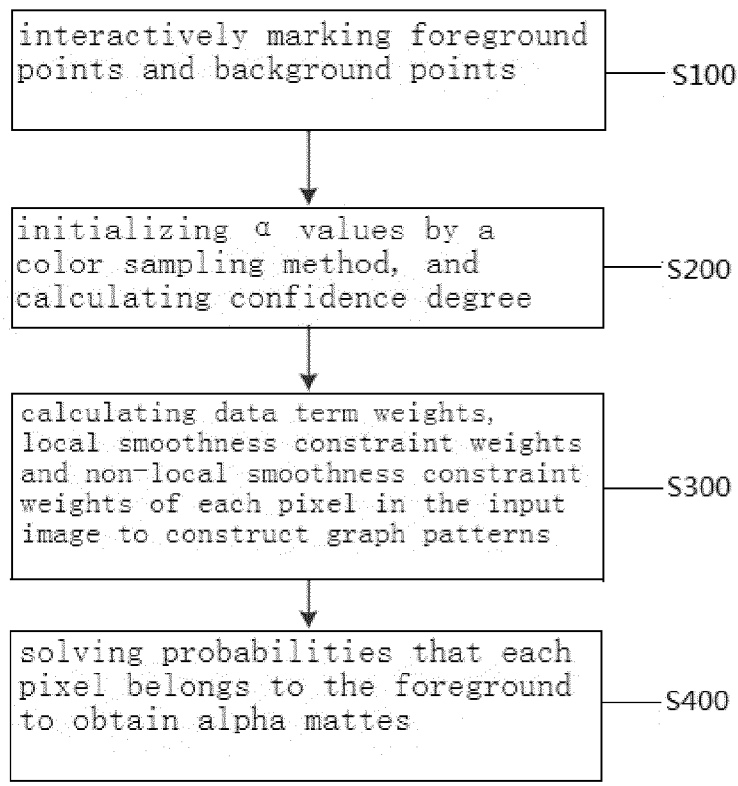
FIG. 1 is a flow chart of the present invention.

The present invention proposes a novel image foreground matting method based on neighborhood and non-neighborhood smoothness priors. The method comprises the following steps:

step S100, interactively marking foreground points and background points by a user, which comprises:

marking foreground points and background points in the image by the user with a brush, wherein pixels covered by a white brush are foreground pixels, pixels covered by a black brush are background pixels, and the other pixels are the unknown pixels; or providing a black-white-gray trimap of the same size as that of the input image by the user, wherein pixels of the input image to which the white area corresponds are the known foreground pixels, pixels of the input image to which the black area corresponds are the known background pixels, and pixels of the input image to which the gray area corresponds are the unknown pixels;

setting α values of the known foreground pixels to 1, and setting α values of the known background pixels to 0.

Step S200, as for the color value C of each unknown pixel, searching for k foreground pixels F and k background pixels B which are nearest to the unknown pixel in term of spatial distance, pairing the foreground pixels and background pixels to form $k^2$ foreground-background point pairs, calculating the probability a that the unknown pixel belongs to the foreground according to the color of the unknown pixel, and calculating α values according to the following equation:

$$\alpha' = \frac{(C-B_j)(F_i-B_j)}{\|F_i-B_j\|^2},$$

calculating confidence degree of the unknown pixel according to the difference $d(F_i,B_j)$ between the color value C of the unknown pixel and the color value $\alpha'F_i+(1-\alpha')B_j$ which is restored on basis of α' and the foreground-background point pairs; selecting α' values to which the foreground-background point pairs with the highest confidence degree correspond as the estimated α values of C, and selecting the corresponding confidence degree as the confidence degree for the estimated α values of C; admitting α values of the unknown pixel of which confidence degree is larger than a threshold, and admitting C as a known pixel.

Step S300, calculating data term weights, neighborhood smoothness constraint term weights and non-neighborhood smoothness constraint term weights of each pixel in the input image to construct graph patterns of all pixels of the input image, which comprises the step of:

step S310, calculating the data term weight for each pixel in the input image, wherein the data term weight is expressed by $W_{(i,F)}$ which indicates probabilities that the pixel belongs to the foreground and $W_{(i,B)}$ which indicates probabilities that the pixel belongs to the background, the values of $W_{(i,F)}$ and $W_{(i,B)}$ are determined from the known α values or α values estimated in step S200, and $W_{(i,F)}$ and $W_{(i,B)}$ are calculated according to the following equations:

$$W_{(i,F)} = \gamma \alpha, W_{(i,B)} = \gamma(1-\alpha),$$

where γ is a parameter to balance the data term and the smoothness set. In our tests, γ is always set to 0.1. Here, $W_F$ and $W_B$ are used to represent $\{W_{(i,F)} | i=1, \ldots, N\}$ and $\{W_{(i,B)} | i=1, \ldots, N\}$, respectively.

Step S320, as for each pixel i in the image, constructing neighborhood smoothness constraint by Laplacian approach within a 3*3 fixed-size window $w_k$, and calculating the neighborhood smoothness constraint term weight value $W_{ij}^{lap}$ of the neighboring pixel j according to the following equation:

$$W_{ij}^{lap} = \delta \sum_k \frac{1+(C_i-\mu_k)\left(\sum_k+\frac{\varepsilon}{9}I\right)^{-1}(C_j-\mu_k)}{9},$$

where, δ is a parameter which controls the intensity of neighborhood smoothness, $\mu_k$ and $\Sigma_k$ represent the color average and variance of in each window respectively, and ε is a regularized coefficient and is set to $10^{-5}$.

Figure 3:
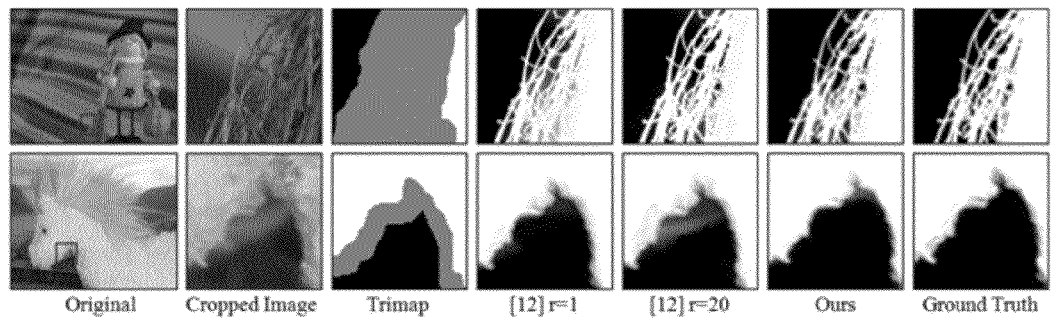
FIG. 3 is a diagram illustrating the application of non-neighborhood prior in the present invention.

The neighborhood smoothness prior can enhance the neighborhood smoothness for image foreground matting result. However, it is insufficient to only apply neighborhood smoothness prior. During calculating Laplacian matrix, it is difficult to set a proper size for the neighborhood window. A small window may be insufficient to capture the detail information of structures. On the other hand, a large window may destroy the color line model, which will also lead to bad results. As shown in FIG. 3, in the closed-form image foreground matting (closed-form matting) method in which only neighborhood smoothness prior is applied, as for the first row of input images, a large window (41*41) is required to capture the structure for alpha matting. However, as for the second row of input images in FIG. 3, a small window (3*3) is required to ensure the validity of color line model in the complicated background. He et al. designs an adaptive method which selects windows of different size with respect to different image areas. In contrast, we combine Laplace neighborhood smoothness prior and neighborhood smoothness prior, and use a small fixed-size window (3*3), i.e., which provides good results in all these examples. A small window will lead to a sparser Laplace matrix, which improves the timeliness of calculating.

Step S330, as for each pixel I of the input image, getting k neighboring pixels in the characteristic space which are nearest to pixel i in term of Euclidean distance, constructing the non-neighborhood smoothness constraint by a local linear embedded dimension reduction approach, and obtaining the non-neighborhood smoothness constraint term weight value $W_{im}^{lle}$ under the constraint of $\Sigma_{m=1}^{K} W_{im}^{lle}=1$ by minimizing the following equation:

$$W^{lle} = \underset{W_{im}^{lle}}{\operatorname{argmin}} \sum_{i=1}^{N} \left\| X_i - \sum_{m=1}^{K} W_{im}^{lle} X_{im} \right\|^2,$$

where, $X_i$ indicates the characteristics $(r_i,g_i,b_i,x_i,y_i)$ of pixel i, $(r_i,g_i,b_i)$ is the RGB color value of pixel i, and $(x_i,y_i)$ is coordinate positions of pixel i in the image. The resulting matrix $W^{lle}$ represents the non-neighborhood manifold constraint.

In the foreground matting algorithm which utilizes non-neighborhood smoothness prior, for example, the neighborhood linear preserving edit propagation algorithm, α values of the known pixels are kept constant, and each pixel is regarded as a linear combination of its neighboring pixels in the characteristic space. For example, in FIG. 2, A pixel can be obtained from a linear combination of the colors of pixel B and C according to $A=w_1 B+(1-w_1)C$. In alpha matting, $\alpha_A=w_1\alpha_B+(1-w_1)\alpha_C$. Here, $\alpha_A$, $\alpha_B$, $\alpha_C$ are scalar quantities which correspond to α values of pixel A, B, and C respectively. When B and C are known foreground background pixels (for example: $\alpha_B=1$, $\alpha_C=0$), the manifold preserving condition only simply requires $\alpha_A=w_1$. In fact, $w_1$ is an estimated value of $\alpha_A$ based on color sampling. Further, B and C can be unknown pixels, so that there are more constraint conditions for preserving neighborhood manifold structure than those for color sampling. It is noted that A may be far away from B and C, since neighbors are found in the characteristic space. Thus, manifold preserving constraint in fact is a non-neighborhood smoothness constraint which links α values of remote pixels. This is very useful for information propagation across the whole image, while the neighborhood smoothness constraint in Laplacian image matting can only propagate information within the neighboring neighborhood windows.

When only non-neighborhood smoothness prior is applied, it is insufficient to solve the problem of alpha matting accurately. As shown in the case of the first row in FIG. 4, when most α values of the unknown pixels approach 0 or 1, the non-neighborhood smoothness prior can provide satisfactory results. However, as shown in the case of the second row, the mere non-neighborhood smoothness prior cannot handle an image with a large translucent area. The reason lies in that neighbors for pixels with α values close to 0.5 are all unknown pixels in the characteristic space. Thus, α values of these pixels are less subject to the manifold preserving constraint conditions. In contrast, when neighborhood smoothness constraints from Laplacian matting are applied, good results are provided in all examples.

Step S400, according to α values of the known pixels, under the constraint of graph patterns from step S300, solving probabilities that each pixel belongs to the foreground by minimizing the following energy equation, so as to obtain alpha mattes:

$$E = \lambda \sum_{i \in S}(\alpha_i - g_i)^2 + \sum_{i=1}^{N}\left(\left(\sum_{j \in N_i} W_{ij}\right)\alpha_i - \sum_{j \in N_i}W_{ij}\alpha_j\right)^2,$$

where, N refers to all points in the graph patterns, and comprises all pixels in the image lattice and two sets of virtual points $\Omega_F$ and $\Omega_B$ (which represent the foreground pixels and the background pixels respectively); $W_{ij}$ represents three kinds of weight values, which comprise data term $W_{(i,F)}$ and $W_{(i,B)}$, neighborhood smoothness term $W_{ij}^{lap}$, and non-neighborhood smoothness term $W_{ij}^{lle}$; the set $N_i$ refers to the set of neighbors for pixel i, and comprises two sets of virtual points, i.e., neighboring pixels within the 3*3 window and the closest K pixels in the RGBXY space.

The above function can be expressed in the following matrix form:

$$E=(\alpha-G)^T\Lambda(\alpha-G)+\alpha^T L^T L\alpha,$$

where:

$$L_{ij} = \begin{cases} W_{ii}: & \text{if } i = j, \\ -W_{ij}: & \text{if } i \text{ and } j \text{ are neighbours}, \\ 0: & \text{otherwise}, \end{cases}$$

$$\text{and } \Lambda_{ii} = \begin{cases} \lambda & i \in S \\ 0 & \text{otherwise} \end{cases}, \quad G_i = \begin{cases} g_i & i \in S \\ 0 & \text{otherwise} \end{cases}.$$

The expression of the above energy equation in the matrix form is a quadratic equation of α, and α values can be minimized by solving the following linear equation:

$$(\Lambda+L^T L)\alpha=\Lambda G.$$

The above equation is a system of sparse linear equations, and a global optimal closed-form solution can be solved by a preconditioned conjugate gradient method.

The present invention will be further described by way of example with reference to the drawings.

Figure 2:
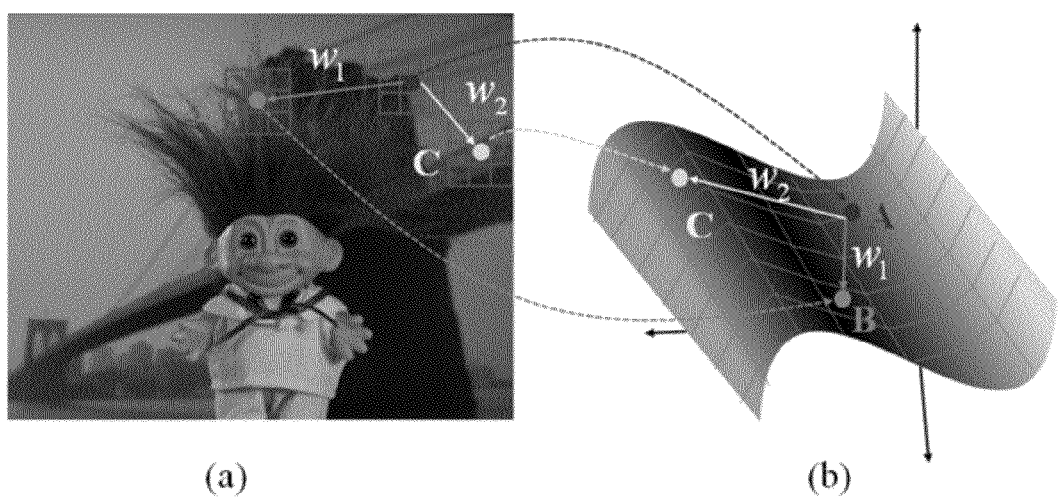
FIG. 2 is a schematic view illustrating the mapping pixels of the input image to the characteristic space in the present invention.

Reference is made to FIG. 2. FIG. 2 is a schematic view illustrating the mapping pixels of the input image to the characteristic space in the present invention. This figure intuitively illustrates the mapping of pixels in the image to the characteristic space (r, g, b, x, y). (a) refers to the input image, (b) is the corresponding characteristic space, and A, B, C are pixels in the image and the corresponding points in the characteristic space. Point A can be expressed linearly by points B, C with a local linear dimension reduction (LLE) approach. Points B, C are neighbors of point A. For simplicity, only two such points are shown here.

Reference is made to FIG. 3. FIG. 3 is a diagram illustrating the application of non-neighborhood prior in the present invention. This figure illustrates the benefits and advantages of applying non-neighborhood prior in the present invention. Two examples are illustrated in the upper and lower row respectively. The first column is the input image, the second column is a local enlarged view (for purpose of more evident demonstration), the third column is the corresponding trimap (which is a local enlarged view, and corresponds to the second column). The fourth column and the fifth column illustrate results generated in a window of different sizes by other methods (in which non-neighborhood prior is not applied). The sixth column illustrates results of the present invention, and the last column illustrates the real correct solutions (which are provided by the evaluation sites). It can be seen that in the existing methods, it is necessary to adjust the size of window to obtain good results. In the example in the first row, good results are provided when r=20 (a relatively large window). In the example in the second row, good results are provided when r=1 (a relatively small window). However, in the practical application, it may be complicated to determine the size of window. According to the method of the present invention, good solutions can be obtained in both of these examples with a single fixed window (3*3).

Figure 4:
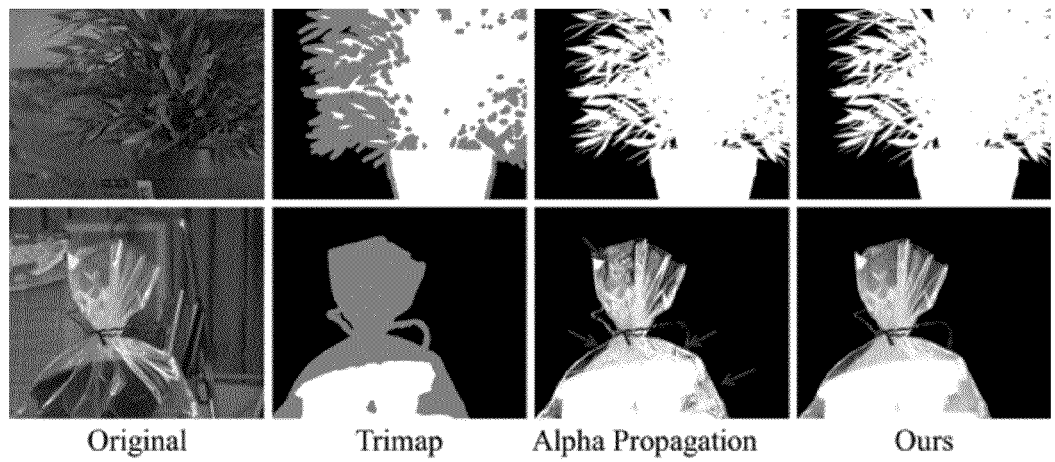
FIG. 4 is a diagram illustrating the application of neighborhood prior in the present invention.

Reference is made to FIG. 4. FIG. 4 is a diagram illustrating the application of neighborhood prior in the present invention; FIG. 4 illustrates the advantages of applying neighborhood prior in the method of the present invention. As compared with the alpha propagation method (in which neighborhood prior is not applied), the present invention provides results which are more smooth, and this is more obvious at positions indicated by arrows.

Figure 5:
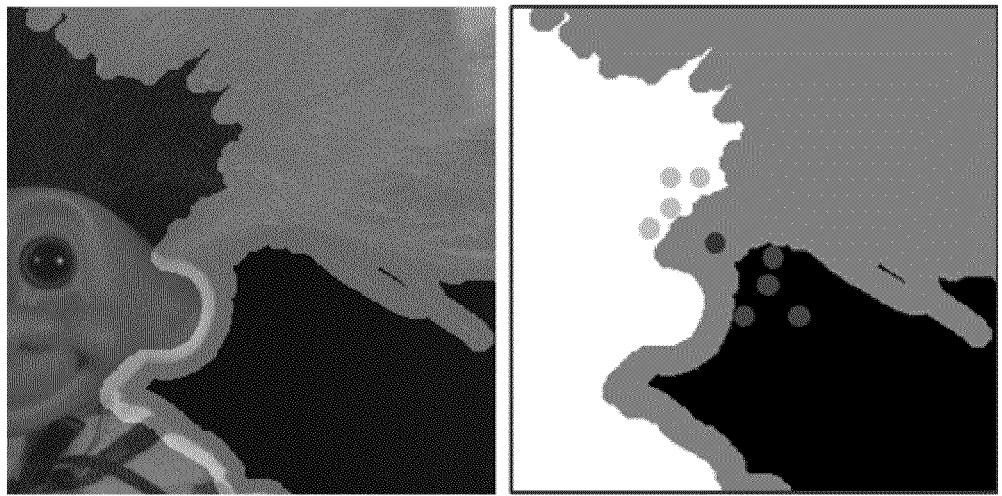
FIG. 5 is a schematic view illustrating color sampling in the present invention.

Reference is made to FIG. 5. FIG. 5 is a schematic view illustrating color sampling in the present invention; FIG. 5 is a schematic view for color sampling. As for unknown points, neighboring pixels are found in the characteristic space. K neighboring pixels are found in the foreground area, and K neighboring pixels are found in the background area. Finally, said K neighboring pixels and said K neighboring pixels are combined to K*K point pairs.

Figure 6:
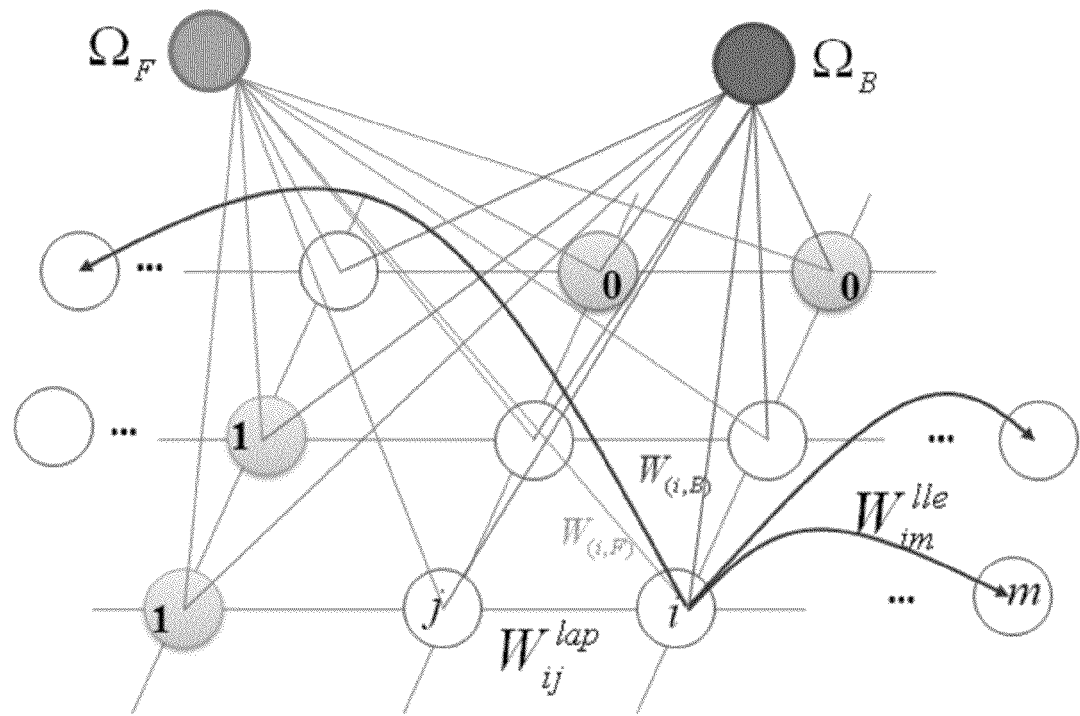
FIG. 6 is a schematic view illustrating graph patterns in the present invention.

Reference is made to FIG. 6. FIG. 6 is a schematic view illustrating graph patterns in the present invention. 0 indicates background pixels, 1 indicates foreground pixels, F and B are two virtual pixels, and the remaining pixels are unknown pixels in the present invention. The connections indicate the neighboring relationship between the pixel pairs, and weights on the connections are weights which are calculated in the present invention calculating.

The general description of the present invention has been set forth above. It is appreciated that all the equivalent modifications to the technical solutions of the present invention fall within the protection scope of the present invention.

The invention claimed is:

1. An image foreground matting method based on neighborhood and non-neighborhood smoothness priors, comprising the steps of:
   step S100, marking a foreground area, a background area, and an unknown area in the input image;
   step S200, initializing probabilities α values that a pixel belongs to the foreground by a color sampling method for each pixel in the unknown area of the input image, calculating confidence degree of α values, admitting α values of pixels of which confidence degree is larger than a given threshold, marking pixels as known pixels, setting α values of each pixel in the foreground area to a maximum value, and setting α values of each pixel in the background area to a minimum value;
   step S300, calculating data term weights of each pixel in the input image according to α values of each pixel, calculating neighborhood smoothness constraint term weights and non-neighborhood smoothness constraint term weights of each pixel, and constructing an overall graph patterns for all pixels of the input image according to three kinds of weights;
   step S400, according to α values of all foreground area pixels, background area pixels and the known pixels in the unknown area, under a constraint of graph patterns from step S300, solving probabilities that each pixel belongs to the foreground by minimizing an energy equation so as to obtain alpha mattes.

2. The image foreground matting method based on neighborhood and non-neighborhood smoothness priors of claim 1, wherein in step S100, a user marks the foreground area, the background area, and the unknown area in the input image via a brush type interaction, or the user inputs a trimap to mark the foreground area, the background area, and the unknown area in the input image.

3. The image foreground matting method based on neighborhood and non-neighborhood smoothness priors of claim 2, wherein α values of each pixel in the foreground area are set to the maximum value 1, and α values of each pixel in the background area are set to the minimum value 0.

4. The image foreground matting method based on neighborhood and non-neighborhood smoothness priors of claim 2, wherein in step S100, marking the foreground area, the background area, and the unknown area by the user via the brush type interaction comprises:
   marking the foreground pixels and background pixels of the image by the user with a brush, wherein pixels covered by a white brush are foreground pixels, pixels covered by a black brush are background pixels, and the other pixels are the unknown pixels; or
   providing a black-white-gray trimap of a same size as that of the input image by the user, wherein pixels of the input image to which the white area corresponds are foreground pixels, pixels of the input image to which the black area corresponds are background pixels, and pixels of the input image to which the gray area corresponds are the unknown pixels.

5. The image foreground matting method based on neighborhood and non-neighborhood smoothness priors of claim 1, wherein in step S200, calculating the probabilities α values that each pixel in the unknown area belongs to the foreground is performed by:
   searching for k foreground pixels Fi (i=1–k) and k background pixels Bj (j=1–k) in the input image which are nearest to the position of the unknown pixel in the input image, wherein each foreground pixel and each background pixel are paired to form k2 foreground-background point pairs Fi Bj, and calculating α' value for each foreground-background point pair according to the following equation to obtain k2 α' values:

$$\alpha' = \frac{(C - B_j)(F_i - B_j)}{\|F_i - B_j\|^2},$$

where C is a color value of the unknown pixel,
wherein, further calculating confidence degree of α' values according to C−(α'F$_i$+(1−α')B$_j$)=d(F$_i$,B$_j$), i.e., calculating confidence degree according to the difference d(F$_i$, B$_j$) between the color value C of the unknown pixel and the color value α'F$_i$+(1−α')B$_j$ which is estimated on basis of α' values, thus obtaining k2 difference values, wherein a small difference value indicates a high confidence degree of α' values; selecting α' values with the highest confidence degree as α values of the unknown pixel, and selecting the corresponding confidence degree as the confidence degree for α values of the unknown pixel; admitting α values of the unknown pixel of which confidence degree is larger than a threshold d, and admitting the unknown pixel as a known pixel.

6. The image foreground matting method based on neighborhood and non-neighborhood smoothness priors of claim 5, wherein in step S300, calculating data term weights of each pixel according to α values of each pixel is performed by:
   step S310, calculating a data term weight according to the following equations, wherein the data term weight comprises two terms, i.e., the weight value W$_{(i,F)}$ which indicates probabilities that the pixel belongs to the foreground and the weight value W$_{(i,B)}$ which indicates probabilities that the pixel belongs to the background, $$W_{(i,F)} = \gamma \alpha, W_{(i,B)} = \gamma(1-\alpha),$$

where γ is a parameter to balance the data term and a smoothness set.

7. The image foreground matting method based on neighborhood and non-neighborhood smoothness priors of claim 5, wherein the parameter γ is set to 0.1.

8. The image foreground matting method based on neighborhood and non-neighborhood smoothness priors of claim 5, wherein in step S300, calculating a neighborhood smoothness constraint term weights of the pixel is performed by:
   step S320, as for pixel i, constructing the neighborhood smoothness constraint by Laplacian approach within a fixed-size window w$_{k(k=m^2)}$ which is centered at pixel i and covers m*m surrounding pixels in the input image, and calculating the neighborhood smoothness constraint term weight value $W_{ij}^{lap}$ of the neighboring pixel j which surrounds pixel i according to the following equation:

$$W_{ij}^{lap} = \delta \sum_k^{(i,j)\in w_k} \frac{1 + (C_i - \mu_k)(\sum_k + \frac{\varepsilon}{m^2}I)^{-1}(C_j - \mu_k)}{m^2},$$

where the number of the neighboring pixel j is m2, lap indicates Laplacian approach, $\delta$ is a parameter which controls a intensity of neighborhood smoothness, $\mu_k$ and $\Sigma_k$ represent a color average and variance of m*m pixels in a window respectively, $\epsilon$ is a regularized coefficient, Ci represents the color value of pixel i, and I is an identity matrix.

9. The image foreground matting method based on neighborhood and non-neighborhood smoothness priors of claim 8, wherein in step S300, calculating the non-neighborhood smoothness constraint term weights of the pixel is performed by:

step S330, generating a characteristic space which comprises all pixels according to characteristic values for each pixel in the input image, getting k neighboring pixels in characteristic space which are nearest to pixel i in term of Euclidean distance, constructing the non-neighborhood smoothness constraint by a local linear embedded dimension reduction approach, and obtaining the non-neighborhood smoothness constraint term weight value $W_{im}^{lle}$ under the constraint of $\Sigma_{m=1}^K W_{im}^{lle}=1$ by minimizing the following equation:

$$W^{lle} = \underset{W_{im}^{lle}}{\operatorname{argmin}} \sum_{i=1}^N \left\| X_i - \sum_{m=1}^K W_{im}^{lle} X_{im} \right\|^2,$$

where lle indicates the local linear embedded dimension reduction approach, m is a neighboring pixel among the k neighboring pixels, N is the number of all pixels in the input image, and $X_i$ indicates a characteristic value of pixel i.

10. The image foreground matting method based on neighborhood and non-neighborhood smoothness priors of claim 9, wherein the characteristic value of pixel i comprises $r_i,g_i,b_i,x_i,y_i$, where $r_i,g_i,b_i$ are RGB color values of pixel i, $x_i,y_i$ are coordinate positions of pixel i in the input image, so that said characteristic space is a five dimensional characteristic space which comprises characteristic values $r_i,g_i,b_i,x_i,y_i$.

11. The image foreground matting method based on neighborhood and non-neighborhood smoothness priors of claim 8, wherein $\epsilon$ is set to a regularized coefficient of 10−5, and m has a value of 3.

* * * * *